(12) United States Patent
Choo et al.

(10) Patent No.: US 6,710,843 B2
(45) Date of Patent: Mar. 23, 2004

(54) IN-LINE SYSTEM AND METHOD FOR MANUFACTURING LIQUID CRYSTAL DISPLAY

(75) Inventors: Dae-Ho Choo, Suwon (KR); Sang-Jun Lee, Suwon (KR); Yong-Joon Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/108,045

(22) Filed: Mar. 27, 2002

(65) Prior Publication Data

US 2002/0191145 A1 Dec. 19, 2002

(30) Foreign Application Priority Data

Jun. 19, 2001 (KR) ........................................ 2001-34761

(51) Int. Cl.⁷ .......................... G02F 1/13; G02F 1/1333; B26F 3/00; B26F 3/02; B23K 26/16; H01L 21/78
(52) U.S. Cl. ........................ 349/187; 349/158; 225/93.5; 219/121.67; 438/460; 216/23
(58) Field of Search .................................. 349/187, 158; 225/93.5; 219/121.67; 216/23; 438/460

(56) References Cited

U.S. PATENT DOCUMENTS

| | | | | |
|---|---|---|---|---|
| 4,794,612 A | * | 12/1988 | Fuke | 372/56 |
| 5,682,218 A | * | 10/1997 | Shimizu et al. | 349/156 |
| 5,691,092 A | * | 11/1997 | Ninomiya et al. | 430/20 |
| 5,852,484 A | * | 12/1998 | Inoue et al. | 349/86 |
| 6,236,446 B1 | * | 5/2001 | Izumi et al. | 349/187 |
| 6,420,678 B1 | * | 7/2002 | Hoekstra | 219/121.75 |
| 6,563,082 B2 | * | 5/2003 | Terada et al. | 219/121.72 |

FOREIGN PATENT DOCUMENTS

| | | |
|---|---|---|
| KR | 10 2000 0014954 | 3/2000 |
| KR | 10 2000 0038529 | 7/2000 |

* cited by examiner

*Primary Examiner*—Tarifar R. Chowdhury
*Assistant Examiner*—Jeanne Andrea Di Grazio
(74) *Attorney, Agent, or Firm*—F. Chau & Associates LLC

(57) ABSTRACT

An in-line system for fabricating a liquid crystal display includes a sealer coating unit for coating a sealer onto a first substrate with a plurality of liquid crystal display cell regions, a liquid crystal injection unit for dropping a liquid crystal onto the first substrate coated with the sealer, and an assembly unit for assembling the first substrate with the second substrate. A sealer hardening unit hardens the sealer interposed between the first and the second substrate to thereby assemble the first and the second substrate with each other. A substrate cutting unit cuts the first and the second substrates along cutting lines through illuminating a laser beam along the cutting lines such that the first and the second substrates are severed into the liquid crystal display cell regions.

11 Claims, 4 Drawing Sheets

IN-LINE SYSTEM AND METHOD FOR MANUFACTURING LIQUID CRYSTAL DISPLAY

BACKGROUND OF THE INVENTION (a) Field of the Invention

The present invention relates to an in-line system for a liquid crystal display, and a method of fabricating a liquid crystal display using the same.

(b) Description of the Related Art

Generally, the fabrication of a liquid crystal display involves processes of fabricating an array substrate where wiring line patterns and switching circuits (in the case of an active matrix type) are formed on a glass substrate, a liquid crystal display cell process where alignment treatment, spacer formation and injection of a liquid crystal between the array substrate and an opposing substrate are made, and a module process where attachment of driver ICs and mounting of a backlight are made.

A plurality of liquid crystal display cell regions are simultaneously formed at a mother glass in the array substrate fabrication process. The plurality of liquid crystal display cell regions are severed from each other to form separate display units through cutting in the liquid crystal display cell process.

In the liquid crystal display cell process, a vacuum injection or a drop injection may be made to fill the cells with liquid crystal.

With the vacuum injection, an alignment film is coated onto the substrates to align the liquid crystal molecules, and then surface-treated. Spacers are formed at one of the substrates to maintain the cell gap in a constant manner, and a sealer with a liquid crystal inlet hole is printed around the substrates. The substrates are then aligned and assembled with each other through a hot press process with a thermal-hardening sealer. After grooves are formed at the substrates per a panel unit through scribing, the substrates are severed from each other through impact cutting. The respective panels are put into a vacuum vessel such that the liquid crystal inlet hole of the sealer is dipped into a liquid crystal. In this way, the liquid crystal is injected into the liquid crystal display cell. Finally, the liquid crystal inlet hole is sealed such that the injected liquid crystal is contained.

With the drop injection, an alignment film is coated onto the substrates, and then surface-treated. Spacers are formed at one of the substrates. After a sealer is formed around one of the substrates in the shape of a closed curve, a liquid crystal is dropped onto the substrate. The two substrates are aligned, and assembled with each other by way of the sealer. Finally, the sealer is hardened.

In the case of drop injection, as liquid crystal is contained within the liquid crystal display cell while being severed into unit cells through scribing, the characteristic of the liquid crystal can deteriorate from loss of alignment force of the alignment films and due to the impact to the substrates, and this can result in poor display characteristics. To prevent such a problem, the substrate severing may be completely made at the groove formation process based on scribing by penetrating the cutting blade through the substrates. In this case, the stress applied to the substrates at the cutting becomes increased. Consequently, the possibility of deteriorating the display characteristic of the liquid crystal display cell is increased and production yield is decreased.

SUMMARY OF THE INVENTION

It is an object of the present invention to provide a system and method of fabricating a liquid crystal display which prevents deterioration of the display characteristic at the severing of the substrates into unit cells, thereby enhancing production yield.

An in-line system for fabricating a liquid crystal display is provided, the in-line system comprising a spacer dispersing unit for dispersing spacers onto at least one of first and second substrates with a plurality of liquid crystal display cell regions; a sealer coating unit for coating a sealer onto the first substrate; a liquid crystal injection unit for dropping liquid crystal onto the first substrate coated with the sealer; an assembly unit for assembling the first substrate with the second substrate; a sealer hardening unit for hardening the sealer interposed between the first and the second substrate to thereby join the first and the second substrate; and a substrate cutting unit for cutting the first and the second substrates along cutting lines through illuminating a laser beam along the cutting lines such that the first and the second substrates are severed into the liquid crystal display cell regions.

Preferably, the substrate cutting unit comprises a laser for pre-heating the first and the second substrates along the cutting lines; a laser transporter for fixing or transporting the laser; and a cooling agent spraying unit for cooling the pre-heated first and second substrates along the cutting lines. The substrate cutting unit further comprises a substrate transporter for fixing, rotating or transporting the first and the second substrates. The cooling agent spraying unit is mounted on the laser transporter.

According to a preferred embodiment of the present invention, the spacer dispersing unit, the sealer coating unit, the liquid crystal injection unit, the assembly unit, the sealer hardening unit and the substrate cutting unit are designed to be in-line. The in-line system further comprising first and second preliminary alignment units for aligning the first and the second substrates with each other before the assembling, and a heat treatment unit for heat-treating the liquid crystal.

A method is provided for fabricating a liquid crystal display, the method comprising the steps of dispersing spacers onto at least one of first and second substrates with a plurality of liquid crystal display cell regions; coating a sealer onto the first substrate; dropping a liquid crystal onto the first substrate; assembling the first and the second substrates to join with each other; hardening the sealer interposed between the first and the second substrates; and cutting the first and the second substrates along cutting lines using a laser such that the first and the second substrates are severed into a plurality of liquid crystal display cell regions.

The step of cutting the first and the second substrates further comprises the steps of pre-heating the first and the second substrates along the cutting lines through illuminating a laser beam along the cutting lines; cooling the first and the second substrates along the cutting lines through spraying a cooling agent along the cutting lines to thereby form a crack; and propagating the crack along the cutting lines.

According to another preferred embodiment of the present invention, an in-line system for fabricating a liquid crystal display comprises means for dispersing spacers between first and second substrates; means for joining the first and second substrates to form a gap; means for injecting liquid crystal onto the gap; and means for cutting the first and the second substrates along cutting lines such that the first and the second substrates are severed into the liquid crystal display cell regions.

The means for cutting comprises a laser for pre-heating the first and the second substrates along the cutting lines; a laser transporter for fixing or transporting the laser; and a cooling agent spraying unit for cooling the pre-heated first and second substrates along the cutting lines.

The means for joining comprises a sealer coating unit and a sealer hardening unit, the sealer coating unit for coating at least one of the first and second substrates with a sealer and the sealer hardening unit for hardening the sealer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF PREFERRED EMBODIMENTS

Preferred embodiments of this invention will be explained with reference to the accompanying drawings.

Figure 1:
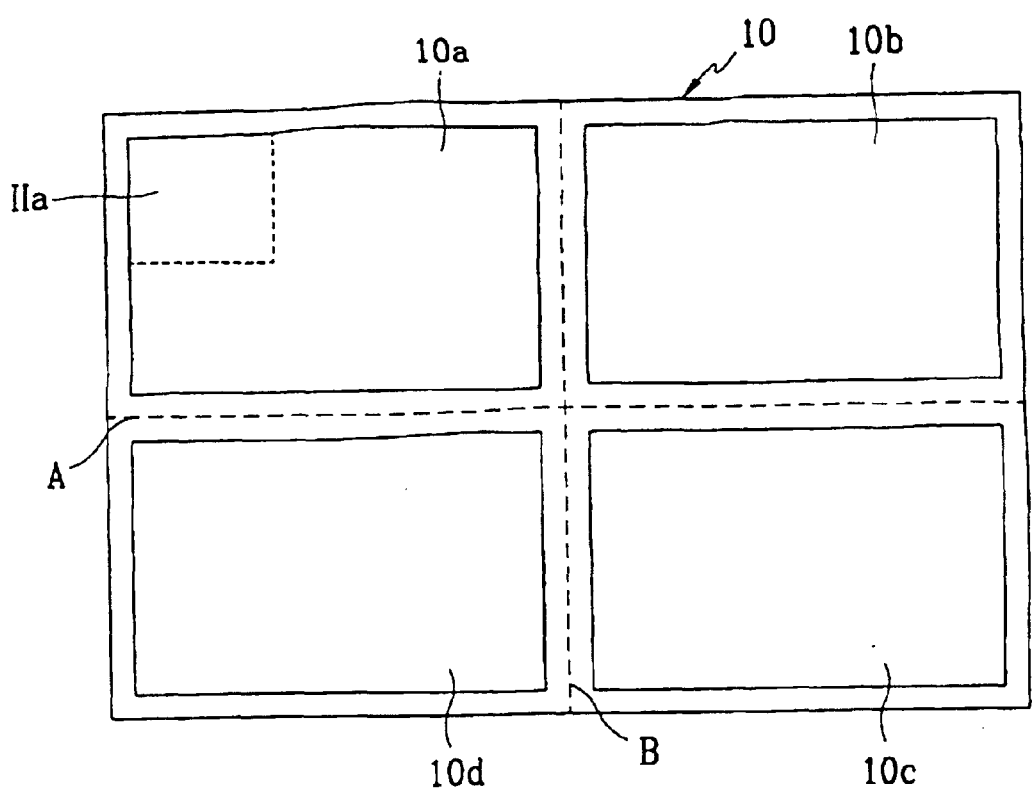
FIG. 1 is a plan view of a mother panel for a liquid crystal display with a plurality of liquid crystal display cell regions according to a preferred embodiment of the present invention.
Figure 2A:
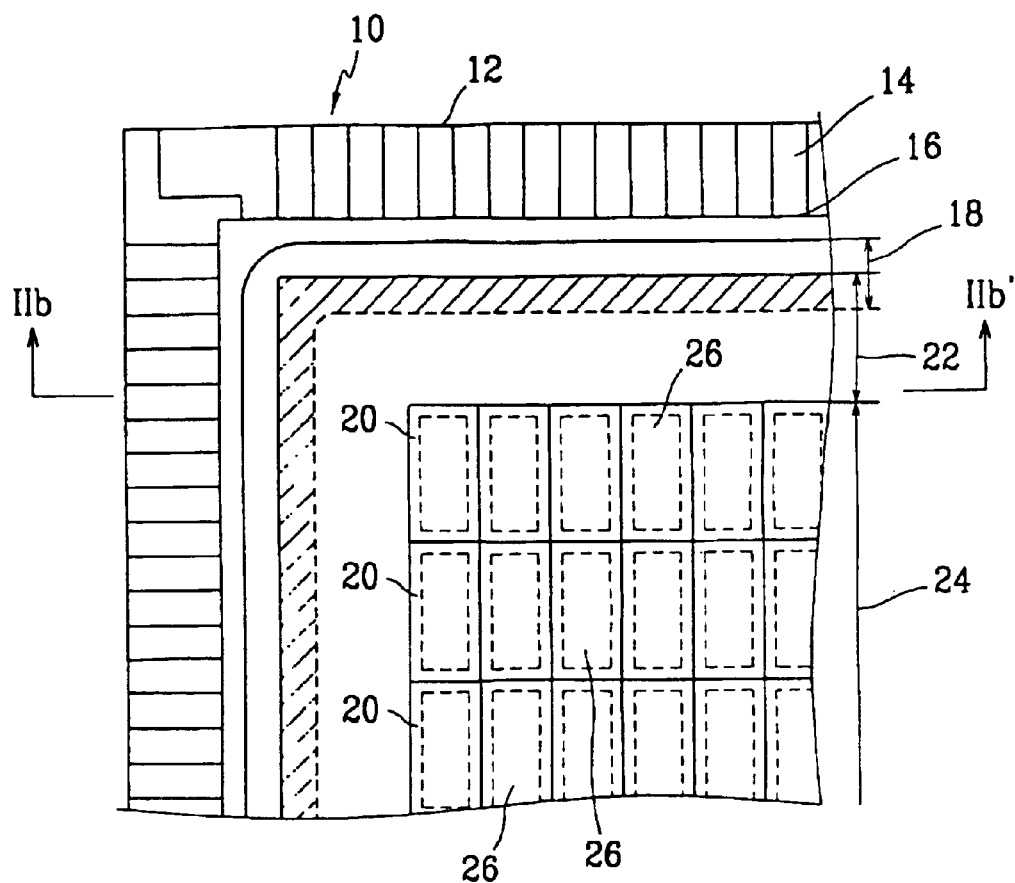
FIG. 2A is an amplified view of the IIa portion of FIG. 1.
Figure 2B:
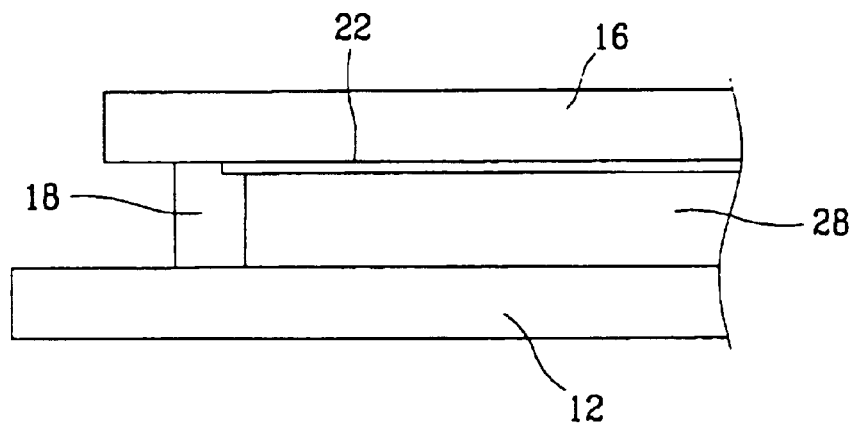
FIG. 2B is a cross sectional view of the liquid crystal display taken along the IIb–IIb' line of FIG. 2A.

FIG. 1 is a plan view of a mother panel for a liquid crystal display with a plurality of liquid crystal display cells according to a preferred embodiment of the present invention, FIG. 2A is an amplified view of the IIa portion of FIG. 1, and FIG. 2B is a cross sectional view of the liquid crystal display taken along the IIb–IIb' line of FIG. 2A.

As shown in FIG. 1, four liquid crystal display cell regions 10a, 10b, 10c and 10d are formed at the mother panel 10. Cutting lines A and B for severing the mother panel 10 into several liquid crystal display unit cells are indicated with dotted lines. The number of liquid crystal display cell regions to be formed at one mother panel may be altered depending upon the dimension of the mother panel and the liquid crystal display cell.

A plurality of pixel regions 26 are formed at an array substrate 12 of the mother panel 10 in a matrix form while collectively defining a display area 24. A thin film transistor (not shown) is formed at each pixel region 26. The thin film transistor is formed with a gate electrode, a drain electrode, and a source electrode. The gate electrode of the thin film transistor is connected to a gate line (not shown), and the drain electrode thereof to a data line (not shown). The source electrode of the thin film transistor is connected to a pixel electrode (not shown) formed at the pixel region 26. The data lines and the gate lines are connected to driving circuits (not shown) via terminals 14 formed at the outer periphery of the array substrate 12.

A color filter substrate 16 faces the array substrate 12. The color filter substrate 16 is established to be smaller than the array substrate 12 by the area of the terminals 14. A common electrode (not shown) and color filters of red R, green G and blue B (not shown) are formed at the color filter substrate 16.

A display area black matrix 20 and a peripheral area black matrix 22 are formed at the color filter substrate 16. The display area black matrix 20 partitions the pixel regions 26 within the display area to prevent leakage of light at the inter-pixel bordering area while absorbing light directed at the thin film transistors to prevent current leakage. The peripheral area black matrix 22 is provided to absorb light directed at the peripheral area external to the display area.

The array substrate 12 and the color filter substrate 16 are assembled to face each other by way of an ultraviolet (UV) hardening sealer 18 forming a gap there between. A liquid crystal 28 fills the gap between the substrates 12 and 16. The liquid crystal is contained by the ultraviolet hardening sealer 18. The sealer 18 is formed with a material that does not mix with the liquid crystal 28 to prevent the liquid crystal 28 from being contaminated if it comes in contact with the sealer 18 before the sealer is hardened.

The substrates 12 and 16 are spaced apart from each other with a predetermined cell gap. The distance of the cell gap is kept constant by using spacers of a predetermined size (not shown). However, if the distribution density of the liquid crystal 28 is not uniform at the entire area of the substrates, the cell gap cannot be maintained in a constant manner. In this case, the image displayed on the display screen of the display device is deteriorated. Therefore, the distribution density of the liquid crystal 28 should be controlled in a uniform manner.

When the mother panel 10 is severed by cutting into the liquid crystal display cell regions 10a, 10b, 10c and 10d along the cutting lines A and B, the stress applied to the substrates 12 and 16 with the cutting should be minimized to prevent deformation of the liquid crystal display cells and deterioration of the liquid crystal 28.

A method of fabricating the liquid crystal display using an in-line system will be now explained with reference to FIGS. 3 and 4.

Figure 3:
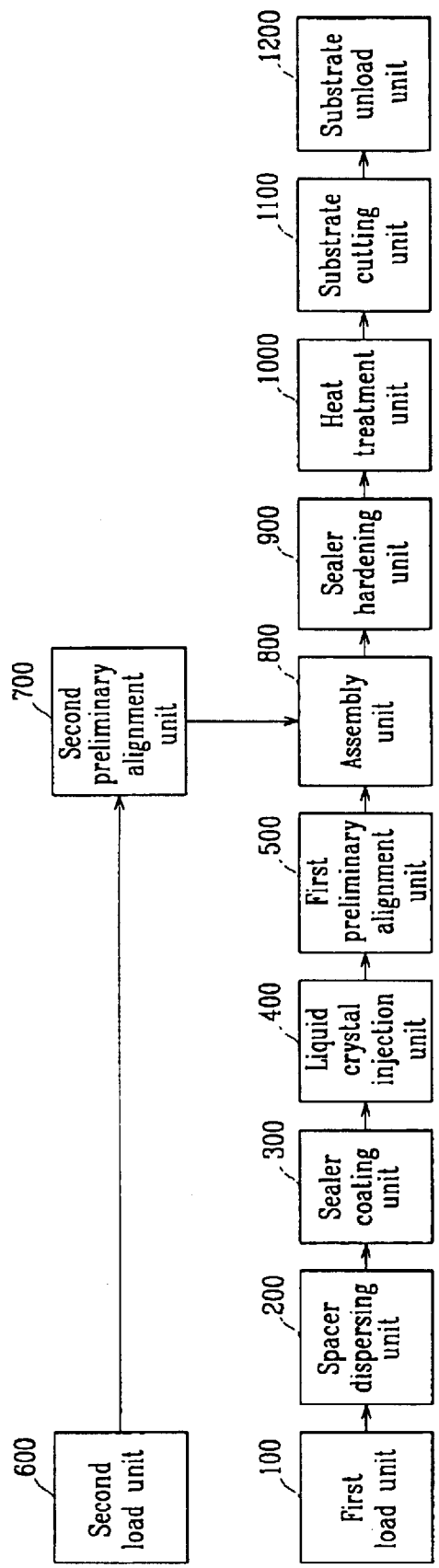
FIG. 3 is a block diagram of an in-line system for fabricating the liquid crystal display shown in FIG. 1.
Figure 4:
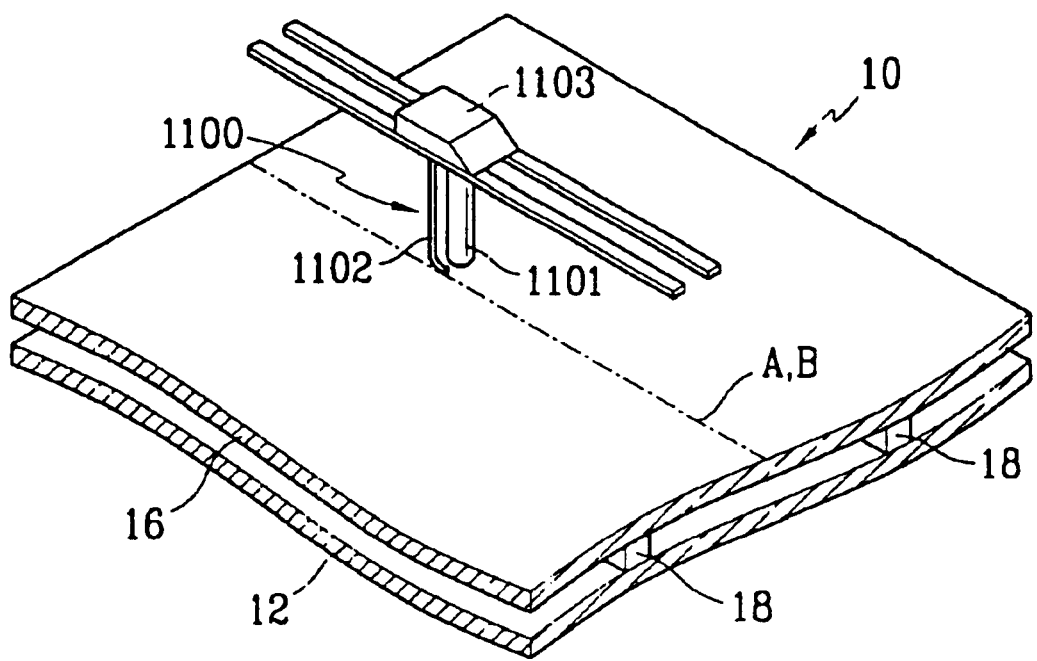
FIG. 4 illustrates the process of cutting the substrates of the mother panel shown in FIG. 1 using a substrate cutting unit.

FIG. 3 is a block diagram of the in-line system, and FIG. 4 illustrates a process of cutting the substrates using a substrate cutting unit.

As shown in FIG. 3, the in-line system includes a first load unit 100 where one-sided substrates are classified and loaded, a spacer dispersing unit 200, a sealer coating unit 300, a liquid crystal injection unit 400, and a first preliminary alignment unit 500. The in-line system further includes a second load unit 600, a second preliminary alignment unit 700, an assembly unit 800, a sealer hardening unit 900, a heat treatment unit 1000, a substrate cutting unit 1100, and a substrate unload unit 1200. The first load unit 100, the spacer dispersing unit 200, the sealer coating unit 300, the liquid crystal injection unit 400, the first preliminary alignment unit 500, the assembly unit 800, the sealer hardening unit 900, the heat treatment unit 1000, the substrate cutting unit 1100 and the unload unit 1200 are sequentially connected to each other by way of an in-line transporter (not shown) capable of transporting the substrates per the in-line processing time unit. The second load unit 600 and the second preliminary alignment unit 700 are connected to the assembly unit 800 by way of another in-line transporter (not shown). In case the time period of cutting the substrates 12 and 16 at the substrate cutting unit 1100 differs from the in-line processing time period, a plurality of substrate cutting units may be provided to ensure that the processing is in-line.

The bottom substrates 12 are classified, and loaded in the first load unit 100. The spacer dispersing unit 200 disperses spacers onto the bottom substrate 12 to maintain the gap between the two substrates 12 and 16 in a constant manner. The sealer coating unit 300 coats a sealer 18 onto the bottom substrate 12 in the shape of a closed curve. The liquid crystal injection unit 400 drops liquid crystal 28 into the liquid crystal display cell regions 10a to 10d defined by the sealer 18 of the bottom substrate 12 using a liquid crystal injector (not shown). The liquid crystal injector may bear a shape of a syringe capable of dropping the liquid crystal 28 in a small scale, or a shape of a sprayer with a nozzle capable of dropping the liquid crystal 28 in a full scale. The first preliminary alignment unit 500 preliminarily aligns the bottom substrate 12 having the sealer 18 and the liquid crystal 28 with the top substrate 16 before the assembling.

The top substrates 16 are classified, and loaded in the second load unit 600. The second preliminary alignment unit 700 preliminarily aligns the top substrate 16 with the bottom substrate 12 before the assembling. The assembly unit 800 assembles the bottom and the top substrates 12 and 16 opposite each other. Compression plates (not shown) are provided at the assembly unit 800 to apply pressure to the substrates 12 and 16. The sealer hardening unit 900 hardens the sealer 18 interposed between the substrates 12 and 16. The heat treatment unit 1000 makes heat treatment with respect to the substrates 12 and 16 to align the liquid crystal 28 in a stable manner. The substrate cutting unit 1100 illuminates a laser beam onto the substrates 12 and 16 along the cutting lines A and B using a cutter to thereby sever the substrates 12 and 16 into the liquid crystal display unit cell regions 10a to 10d. The unload unit 1200 unloads the severed substrates 12 and 16.

In case it is intended to form the spacers at the top substrate 16, the spacer dispersing unit 200 may be positioned between the second load unit 600 and the second preliminary alignment unit 700.

The process of cutting the substrates using the substrate cutting unit 1100 will now be explained with reference to FIG. 4.

As shown in FIG. 4, the substrate cutting unit 1100 includes a laser 1101 for pre-heating the substrates 12 and 16 through illuminating a laser beam along the cutting lines A and B. A cooling agent sprayer 1103 is installed at the rear of the laser 1101 to spray a cooling agent to the laser-illuminated area such that a minute crack is made at the substrates 12 and 16 along the cutting lines A and B. The substrate cutting unit 1100 further includes a laser transporter 1102 for fixing or transporting the laser 1101 and the cooling agent sprayer 1103. The substrate cutting unit 1100 may further include a substrate transporter for fixing, transporting or rotating the mother panel 10 with the bottom and top substrates 12 and 16 assembled by way of the sealer 18.

In the process of cutting the substrates 12 and 16, the laser 1101 illuminates a laser beam onto the substrates 12 and 16 along the cutting lines A and B, thereby pre-heating the substrates 12 and 16 up to a predetermined temperature. Thereafter, the cooling agent sprayer 1103 sprays a cooling agent onto the pre-heated substrates 12 and 16 to thereby cool the pre-heated substrates 12 and 16 in a rapid manner. Thermal compression and thermal expansion are made at the substrates 12 and 16 along the cutting lines A and B due to the heating and the cooling so that high thermal stress is applied to the substrates 12 and 16. Consequently, a minute crack is formed at the substrates 12 and 16 along the cutting lines A and B, and propagated along the cutting lines A and B as the laser beam illumination and the cooling agent spraying are made. In this way the mother panel 10 is completely severed into the liquid crystal display unit cell regions 10a to 10d.

As described above, in the substrate cutting process, a laser beam is illuminated onto the substrates 12 and 16 in a non-contact manner to form a minute crack at the substrates 12 and 16. The minute crack is propagated, thereby severing the substrates 12 and 16. In this process, the laser-based cutter does not contact the substrates 12 and 16 and stress from cutting substrates can be prevented. Furthermore, as the formation and propagation of the minute crack at the substrates 12 and 16 are made without applying pressure to the substrates, deformation of the liquid crystal display cell or deterioration of the liquid crystal and the alignment films does not occur. Accordingly, the resulting display device can involve the desired display characteristic in a stable manner. In addition, as the liquid crystal display cell regions 10a to 10d are designed without considering the cutting margin as with the scribing process, the cell regions 10a to 10d can be enlarged in size.

In sum, a laser is introduced in the substrate cutting process while preventing the possible application of cutting stress to the substrates so that the liquid crystal or the alignment films are prevented from being deteriorated. Consequently, the display characteristic of the resulting liquid crystal display can be enhanced.

While the present invention has been described in detail with reference to the preferred embodiments, those skilled in the art will appreciate that various modifications and substitutions can be made thereto without departing from the spirit and scope of the present invention as set forth in the appended claims.

What is claimed:

1. An in-line system for fabricating a liquid crystal display, the in-line system comprising:

a spacer dispersing unit for dispersing spacers onto at least one of first and second substrates with a plurality of liquid crystal display cell regions;

a sealer coating unit for coating a sealer onto the first substrate;

a liquid crystal injection unit for dropping liquid crystal onto the first substrate coated with the sealer;

an assembly unit for assembling the first substrate with the second substrate;

a sealer hardening unit for hardening the sealer interposed between the first and the second substrate to thereby join the first and the second substrate; and a substrate cutting unit for cutting the first and the second substrates along cutting lines through illuminating a single laser beam along the cutting lines such that the first and the second substrates are severed into the liquid crystal display cell regions, wherein the substrate cutting unit comprises a laser emitting the single laser beam for pre-heating both the first and the second substrates along the cutting lines.

2. The in-line system of claim 1 wherein the substrate cutting unit further comprises:

a laser transporter for fixing or transporting the laser; and a cooling agent spraying unit for cooling the pre-heated first and second substrates along the cutting lines.

3. The in-line system of claim 2 wherein the substrate cutting unit further comprises a substrate transporter for fixing, rotating or transporting the first and the second substrates.

4. The in-line system of claim 2, wherein the cooling agent spraying unit is mounted on the laser transporter.

5. The in-line system of claim 1 wherein the spacer dispersing unit, the sealer coating unit, the liquid crystal injection unit, the assembly unit, the sealer hardening unit and the substrate cutting unit are designed to be in-line.

6. The in-line system of claim 1 further comprising first and second preliminary alignment units for aligning the first and the second substrates with each other before the assembling, and a heat treatment unit for heat-treating the liquid crystal.

7. A method of fabricating a liquid crystal display, the method comprising the steps of:

dispersing spacers onto at least one of first and second substrates with a plurality of liquid crystal display cell regions;

coating a sealer onto the first substrate;

dropping a liquid crystal onto the first substrate;

assembling the first and the second substrates to join with each other;

hardening the sealer interposed between the first and the second substrates; and cutting the first and the second substrates along cutting lines using a laser such that the first and the second substrates are severed into a plurality of liquid crystal display cell regions, wherein the step of cutting the first and the second substrates comprises simultaneously pre-heating the first and the second substrates along the cutting lines through illuminating a single laser beam along the cutting lines.

8. The method of claim 7 wherein the step of cutting the first and the second substrates further comprises the steps of:

cooling the first and the second substrates along the cutting lines through spraying a cooling agent along the cutting lines to thereby form a crack; and propagating the crack along the cutting lines.

9. An in-line system for fabricating a liquid crystal display, the in-line system comprising:

means for dispersing spacers between first and second substrates;

means for joining the first and second substrates to form a gap;

means for injecting liquid crystal onto the gap; and means for cutting the first and the second substrates along cutting lines such that the first and the second substrates are severed into the liquid crystal display cell regions, wherein the means for cutting comprises a laser emitting a single laser beam, the single laser beam not being separated for pre-heating both the first and the second substrates along the cutting lines.

10. The in-line system of claim 9 wherein the means for cutting further comprises:

a laser transporter for fixing or transporting the laser; and a cooling agent spraying unit for cooling the pre-heated first and second substrates along the cutting lines.

11. The in-line system of claim 9 wherein the means for joining comprises a sealer coating unit and a sealer hardening unit, the sealer coating unit for coating at least one of the first and second substrates with a sealer and the sealer hardening unit for hardening the sealer.

* * * * *